A. H. FOSS.
ROTARY GAS ENGINE.
APPLICATION FILED MAR. 21, 1912.
1,131,922.
Patented Mar. 16, 1915.
3 SHEETS—SHEET 3.
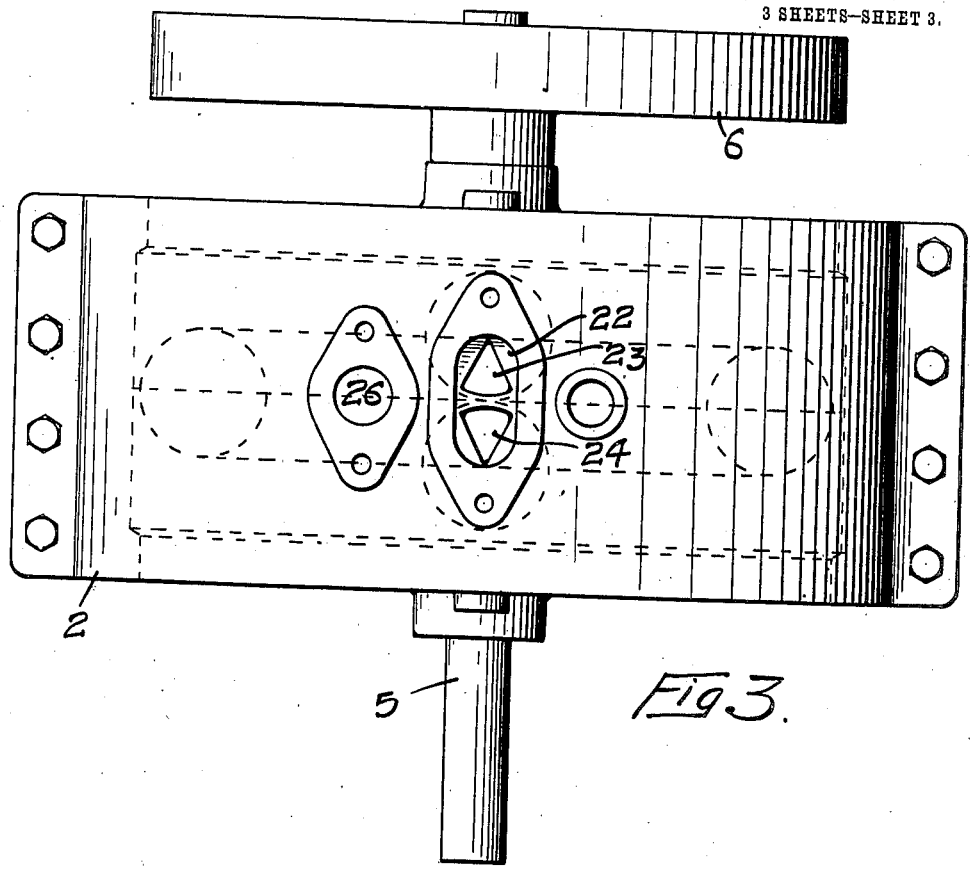
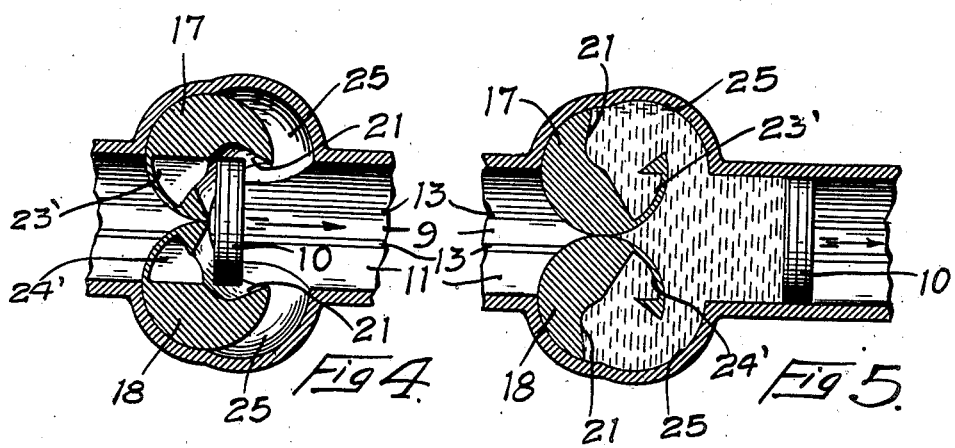
WITNESSES
INVENTOR
ANDREW H. FOSS
BY
ATTORNEYS

UNITED STATES PATENT OFFICE.

ANDREW H. FOSS, OF ELBOW LAKE, MINNESOTA.

ROTARY GAS-ENGINE.

1,131,922.

Specification of Letters Patent.

Patented Mar. 16, 1915.

Application filed March 21, 1912. Serial No. 685,281.

*To all whom it may concern:*

Be it known that I, ANDREW H. FOSS, of Elbow Lake, Grant county, Minnesota, have invented certain new and useful Improvements in Rotary Gas-Engines, of which the following is a specification.

The object of my invention is to provide a rotary gas engine of simple construction and one which can be operated at high speed and will develop power to a high degree.

A further object is to provide a smoothly running engine in which friction of moving parts will be reduced to a minimum.

A further object is to provide an engine which may be operated by steam pressure, if desired.

The invention consists generally in various constructions and combinations, all as hereinafter described and particularly pointed out in the claims.

Figure 1:
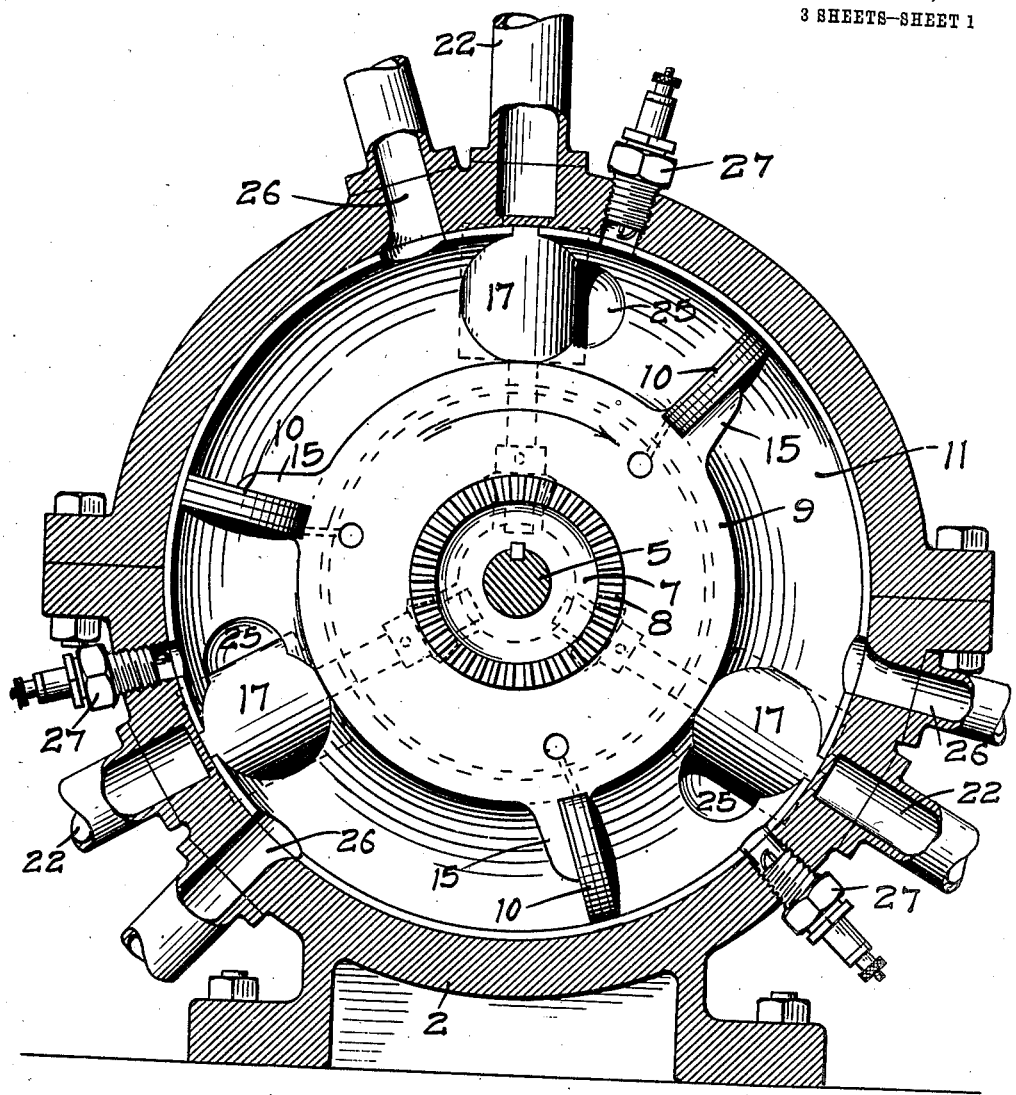
Figure 2:
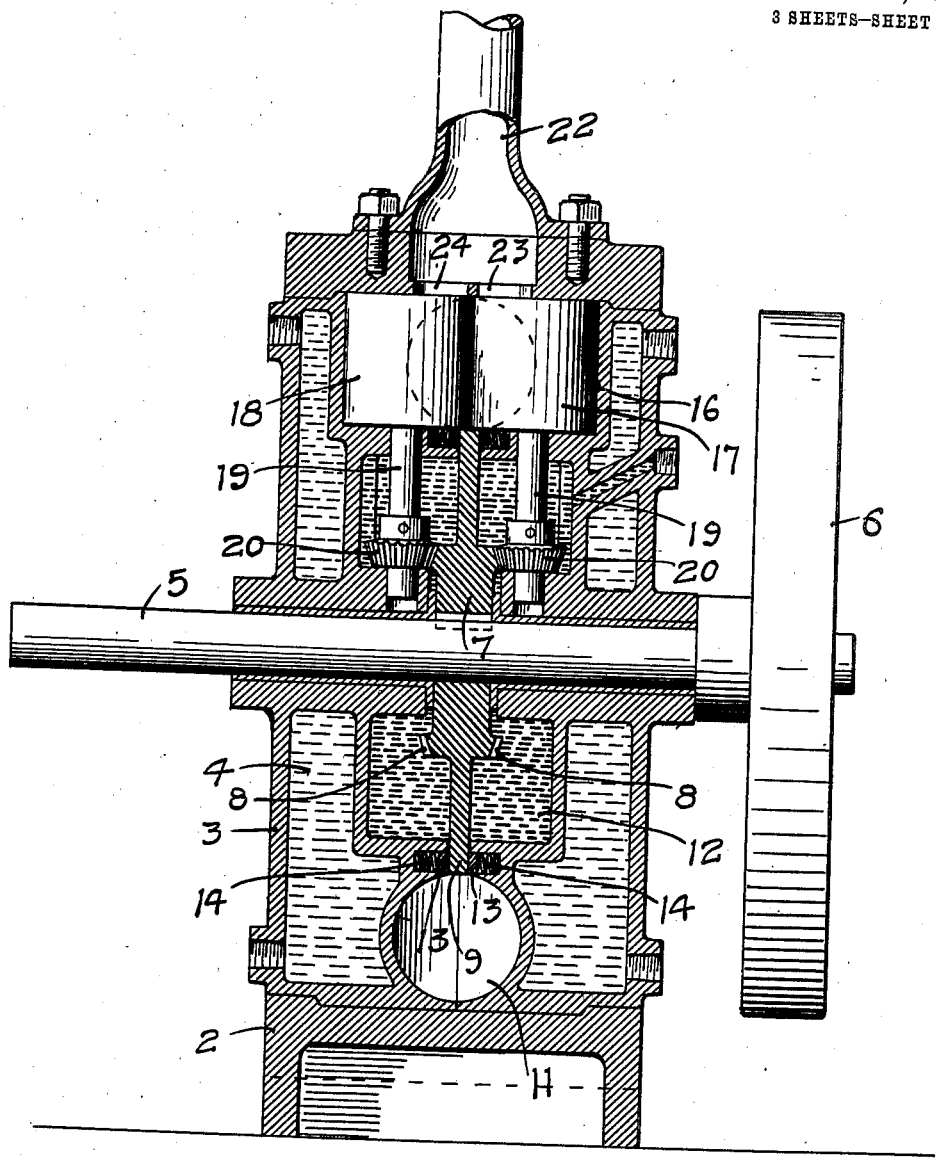

In the accompanying drawings forming part of this specification, Figure 1 is a vertical sectional view through an engine embodying my invention, taken transversely of the engine shaft, Fig. 2 is a similar view taken lengthwise of the shaft, Fig. 3 is a plan view, Fig. 4 is a detail sectional view illustrating a piston passing between the valves of the cylinder, Fig. 5 is a similar view illustrating the combustion chamber charged, preparatory to ignition.

In the drawing, 2 represents a suitable base and 3 a jacket mounted thereon and containing a water cooling chamber 4.

5 is a shaft journaled in the jacket or casing of the engine and having a fly wheel 6. On this shaft a hub 7 is secured and provided near its periphery on each side with bevel gear teeth 8.

A web 9 projects radially from the hub 7 and is provided on its periphery at suitable intervals with piston disks 10 which revolve in a circular cylinder 11. The hub 7 revolves in a chamber 12 that is adapted to contain a supply of oil, the web 9 extending outwardly through the peripheral walls of this chamber, the joint between said web and walls being closed by gasket rings 13 which are yieldingly held in contact with the surface of the web by springs 14. The mingling of the gas in the circular cylinder and the oil in the central chamber is thus prevented. When the shaft 5 is revolved by the hub and disk the pistons 10 will travel in the circular cylinder. Any suitable means may be provided for mounting these pistons on the periphery of the disk, but I prefer to provide brackets 15 for that purpose. I have shown three of these pistons, but a greater or less number may be employed if preferred, depending somewhat upon the size and the desired power of the engine.

The cylinder is provided with valve chambers 16. There are as many of these chambers as there are pistons and in each chamber I arrange a pair of cylindrical valves 17 and 18. The peripheries of these valves contact with one another and form a gas-tight joint, as indicated in Fig. 5, and each valve has a stem 19 provided with a beveled pinion 20 which meshes with the beveled gear 8 of the hub 7 so that when the shaft and hub are revolved the valves 17 and 18 will be revolved also. Each valve has a recess 21 in its peripheral surface and the movement of the valves is timed so that the recess of each pair of valves will be opposite one another at the time when a piston is in position to pass between that pair of valves, as indicated in Fig. 4.

Near each valve chamber is a gas intake pipe 22 which communicates through ports 23 and 24 with similar ports 23' and 24' in the valves 17 and 18, and gas chambers 25 are formed in the valve chambers, as indicated in Fig. 4, through which the gas may circulate during the charging operation. These chambers communicate with the combustion chambers of the cylinder and with the recesses in the valves, insuring ignition of the entire charge and preventing a portion of the charge from being pocketed or trapped in the recesses in the valves, which might occur if the walls of the valve chambers hugged the surfaces of the valves at all points of movement through the chambers. The valve ports 23' and 24' will register with the intake ports 23 and 24 once with each revolution of the valves and will receive a charge under pressure at that time, the charge being delivered throughout the period of communication between the ports. As soon as the valve ports have passed the intake port the combustion chamber formed between the contiguous piston and the valves will be closed, the surfaces of the valves forming abutments and ignition of the gas taking place at this point, the pressure will be applied to the pistons to revolve it and the shaft.

An exhaust port 26 is provided in the rear of each pair of valves and this port is open at all times, the burnt gases being driven forward by the succeeding piston and forced out through the exhaust port as this piston approaches the valves.

In front of each pair of valves I provide a spark plug 27 with electrical connections, not shown, for forming a spark when the parts are in the position indicated in Fig. 5, the combustion chamber being fully charged, the valve ports being closed and the surfaces of the valves contacting with one another to form a gas-tight joint. The ports in the valves communicate with the recesses therein, as indicated in Fig. 4, so that as soon as the ports begin to take gas from the inlet pipe it will flow through the recesses into the combustion chamber of the cylinder until the desired charge is obtained. Each piston as it approaches a pair of valves will drive out the burnt gases resulting from the burning of the charge in the rear of the preceding piston and thereby the cylinder is kept clear of gases and is ready to receive a fresh charge as soon as the piston and a pair of valves are in the proper relative position to form a combustion chamber between them.

I have shown and described this invention for use in connection with an explosive gas, but the same principle may be embodied in a machine using steam as a motive power.

I claim as my invention:—

1. A rotary gas engine comprising a circular cylinder having intake and exhaust ports, a shaft, a hub secured thereon, pistons mounted on said hub and arranged to revolve in said cylinder, rotary valves arranged in pairs in said cylinder and having driving connections with said hub, said valves having intake ports adapted to register at intervals with said inlet ports, said valves also having peripheral recesses communicating with said inlet ports and adapted to receive said pistons and allow their passage between the valves of a pair.

2. The combination, with a circular cylinder having intake and exhaust ports, of a shaft, a hub secured thereon, pistons mounted on said hub and arranged to revolve in said cylinder, valves arranged in pairs in said cylinder and having driving connections with said hub, said valves having intake ports adapted to register at intervals with said inlet ports, said valves also having peripheral recesses communicating with said inlet ports and adapted to receive said pistons and allow their passage between the valves of a pair, the space between said valves and the contiguous piston forming a combustion chamber, and a spark plug mounted in the walls of said chamber.

3. A rotary gas engine comprising a circular cylinder having inlet and exhaust ports, a shaft, pistons mounted on said shaft to revolve in said cylinder, valves arranged in pairs in said cylinder and having a driving connection with said shaft, said valves having intake ports arranged to register at intervals with said cylinder inlet ports, said valves also having recesses communicating with said inlet ports and adapted to receive said pistons and allow their passage between the valves of a pair, said cylinder having gas chambers communicating with the space between a piston and said valves and with the recesses in said valves after the passage of a piston between the valves, the space between said valves and piston forming a combustion chamber, and a spark plug mounted in the walls of said chamber.

4. A rotary gas engine comprising a circular cylinder having intake and exhaust ports, a shaft concentric with said cylinder, pistons mounted on said shaft and adapted to revolve in said cylinder, valves mounted in pairs in said cylinder and having driving connections with said shaft and provided with intake ports arranged to communicate at intervals with the adjacent inlet ports of said cylinder and with the space in said cylinder in advance of said valves, said valves also having peripheral recesses to receive said pistons and allow the passage of a piston between the valves of a pair, the space between said valves and the adjacent piston after it passes a pair of valves forming a combustion chamber, a spark plug mounted in said chamber, said valves being located in advance of the cylinder exhaust ports, each piston as it revolves driving the burnt gases out through an exhaust port as it approaches the pair of valves adjacent to said port.

5. A rotary gas engine comprising a casing, a shaft journaled therein, a hub secured on said shaft, a wall inclosing said hub and spaced from said casing, the space between said wall and casing forming a water chamber, the space inclosed by said wall being adapted to contain a quantity of oil, a circular cylinder inclosing said oil chamber, pistons connected with said hub and arranged to revolve in said chamber, valves mounted in pairs in said cylinder and having their stems geared to said hub within said oil chamber, said cylinder having intake and exhaust ports, said valves having inlet ports arranged to register at intervals with said cylinder inlet ports and also provided with peripheral recesses to receive said pistons and allow the passage of said pistons between the valves of a pair, the walls of said valves contacting with one another and forming a gas-tight joint in the rear of a piston during its initial movement after passing a pair of valves, the space between said valves and the adjacent piston after passing the valves forming a combustion chamber communicating with the inlet ports of said valves, and a spark plug mounted in the walls of said chamber.

6. A rotary gas engine comprising a casing, a shaft journaled therein, a hub secured on said shaft, pistons connected with said hub, valves mounted in said cylinder and having their stems geared to said hub, said cylinder having intake and exhaust ports, said valves having inlet ports arranged to register at intervals with said cylinder inlet ports and also provided with peripheral recesses to receive said pistons, said valves being arranged in pairs with the walls of the valves of a pair contacting with one another and forming a tight joint in the rear of a piston during its initial movement after passing a pair of valves, the space between said valves and the adjacent piston after passing the valves forming a combustion chamber communicating with the inlet ports of said valves.

7. In a rotary gas engine, rotary valves arranged in pairs and having driving connections and provided with intake ports and peripheral recesses communicating with said ports, revolving pistons arranged to enter said recesses and pass between the valves of a pair, the space between the valves of a pair and the adjacent piston forming a combustion chamber.

In witness whereof, I have hereunto set my hand this 13th day of March, 1912.

ANDREW H. FOSS.

Witnesses:
FOSTER E. DYBDAL,
J. E. NELSON.